United States Patent
Shue (10) Patent No.: US 8,554,847 B2
(45) Date of Patent: Oct. 8, 2013

(54) ANTI-SPAM PROFILE CLUSTERING BASED ON USER BEHAVIOR

(75) Inventor: Jyh-Shin (Gareth) Shue, Taipei (TW)

(73) Assignee: Yahoo! Inc., Sunnyvale, CA (US)

( * ) Notice: Subject to any disclaimer, the term of this patent is extended or adjusted under 35 U.S.C. 154(b) by 480 days.

(21) Appl. No.: 12/173,618

(22) Filed: Jul. 15, 2008

(65) Prior Publication Data

US 2010/0017476 A1    Jan. 21, 2010

(51) Int. Cl.
*G06F 15/16* (2006.01)

(52) U.S. Cl.
USPC ............................................ 709/206; 709/207

(58) Field of Classification Search
USPC ................................................ 709/206, 207
See application file for complete search history.

(56) References Cited

U.S. PATENT DOCUMENTS

| | | | | |
|---|---|---|---|---|
| 6,029,195 | A * | 2/2000 | Herz | 725/116 |
| 7,197,539 | B1 * | 3/2007 | Cooley | 709/206 |
| 2003/0187937 | A1 * | 10/2003 | Yao et al. | 709/206 |
| 2008/0010353 | A1 * | 1/2008 | Rounthwaite et al. | 709/206 |

* cited by examiner

*Primary Examiner* — Liangche A Wang
*Assistant Examiner* — Cheikh Ndiaye
(74) *Attorney, Agent, or Firm* — Hickman Palermo Truong Becker Bingham Wong LLP (57) ABSTRACT

A user can be assigned to one of a plurality of filtering profiles to filter the user's incoming email messages. Each filtering profile in the plurality of filtering profiles filters the incoming emails according to a different set of filtering rules. The filtering profiles are applied to incoming emails, and the emails are delivered according to the rules of the currently-assigned filtering profile. The user's actions on the received email is tracked to determine a first performance score for how accurately the first filtering profile is filtering incoming emails of the user, and if the first performance score is less than a score value, the user might be assigned to a different filtering profile.

31 Claims, 5 Drawing Sheets

ANTI-SPAM PROFILE CLUSTERING BASED ON USER BEHAVIOR

FIELD OF THE INVENTION

The present invention relates to filtering received electronic mail messages to determine which messages are spam and which messages are not spam. In particular, embodiments of the present invention relate to assigning a user to an anti-spam filtering profile based on the user's tracked behavior, and monitoring the performance of different filtering profiles.

BACKGROUND OF THE INVENTION

The approaches described in this section are approaches that could be pursued, but are not necessarily approaches that have been previously conceived or pursued. Therefore, unless otherwise indicated, it should not be assumed that any of the approaches described in this section qualify as prior art merely by virtue of their inclusion in this section.

The problem of unwanted emails, commonly referred to as spam, in email-based communication technologies is well-recognized. Spam may include unsolicited messages sent by a computer user over a network to a large number of recipients, sometimes including attached files or hyperlinks. For typical users, spam mostly includes unsolicited commercial messages, but it also includes unsolicited messages sent for malicious, disruptive, or abusive purposes. For example, spammers sometimes send messages in bulk to a particular domain to exhaust the resources of the domain or to spread a virus. These unwanted emails waste the time, money, and resources of end users and service providers.

To combat the problem of spam, numerous anti-spam systems have been developed. Many of the systems currently in use apply a set of rules to incoming email messages to determine how to handle an incoming message. Based on the application of the rules to the message, the anti-spam system determines whether to deliver the message to a user's inbox, to a specially designated spam folder, or in the case of potentially malicious emails such as those that might be carrying a virus, to quarantine the message on an alternate server and not deliver the message at all. The determination might be made by applying a combination of categorical rules, such as quarantining all emails with attached executable files, and a set of aggregating rules that assign a score to an incoming email based on characteristics such as content, origin, file size, and/or the presence of attachments. Emails with a score over a threshold value might be designated as spam and delivered to the user's spam folder.

Most anti-spam systems apply the same global filtering rules to all users. In a system with a large and diverse group of users, using the same global filtering rules for all users limits the system's ability to be tailored to the behavior of any particular user. Specifically, rules that correctly identify spam for one user cause false positives for other users.

Some systems allow users to supplement the global filtering rules by adding their own unique set of categorical rules. Such a system, however, typically does not allow the user to modify the global rules, which in many cases are the ones that detect the majority of spam. Additionally, such a system puts the burden of customizing the system on the user, which is both ineffective and inefficient.

BRIEF DESCRIPTION OF THE DRAWINGS

The present invention is illustrated by way of example, and not by way of limitation, in the figures of the accompanying drawings.

DETAILED DESCRIPTION OF EMBODIMENTS OF THE INVENTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

A system is described hereafter that offers improvements over the anti-spam systems currently used in the art by assigning a filtering profile to a user based on the user's behavior, instead of applying the same global filtering rules to all users. By tracking the user's behavior, it is possible to determine which filtering profile most effectively filters the user's incoming emails. If the filtering profile that would most effectively filter the user's incoming emails is not the profile to which the user is currently assigned, the system can automatically reassign the user to the profile that would most effectively filter the user's incoming mail.

Figure 1:
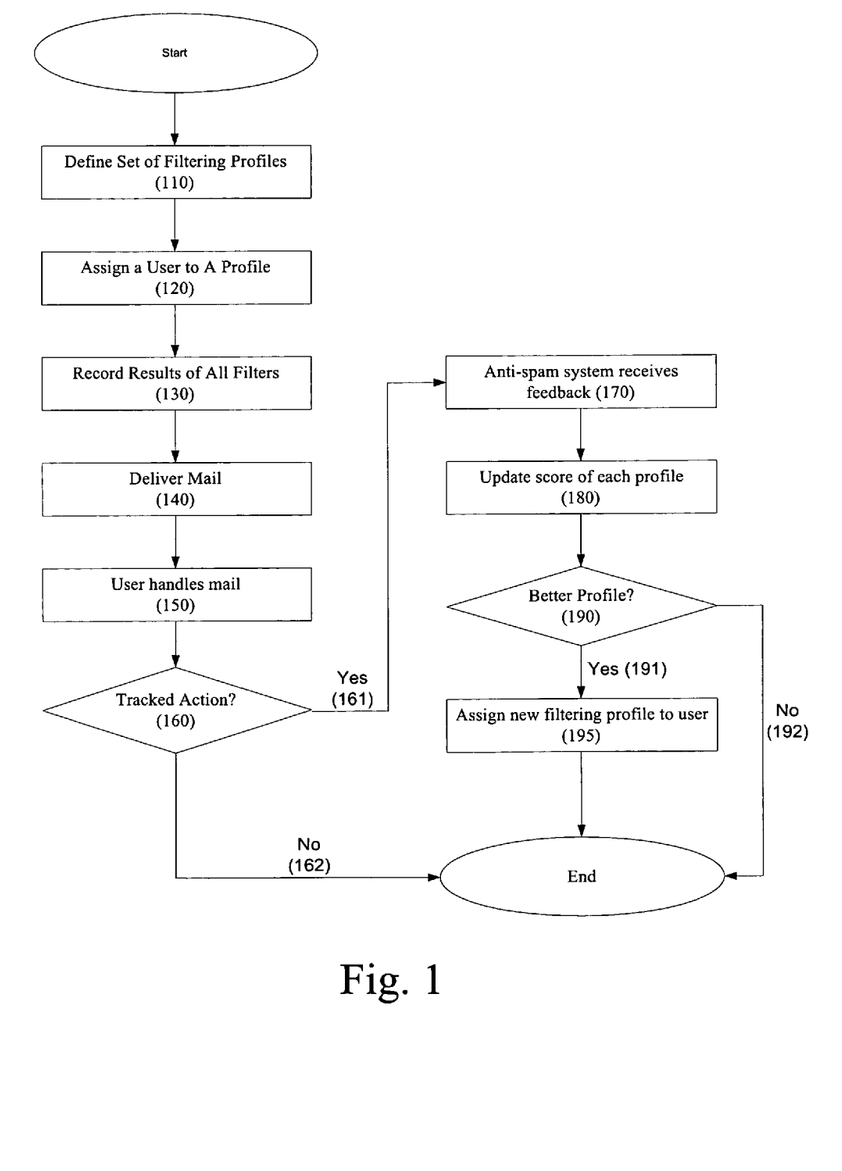
FIG. 1 shows a flow chart illustrating a method of assigning filtering profiles to users.

The flowchart of FIG. 1 illustrates a method for filtering email messages according to one embodiment of the present invention. A system administrator defines a set of filtering profiles (block 110). Each filtering profile within the set can have its own unique combination of categorical and aggregating rules, as well its own unique application of the rules.

Email addresses of users of an anti-spam system are each assigned to one of the filtering profiles (block 120). The initial assignment may be done manually by a system administrator or automatically based on known information associated with a user profile corresponding to an email address. Alternatively, all email addresses might initially be assigned to a filtering profile designated as a default profile.

When an email message is sent to an email address that is assigned to a particular profile (the "currently-assigned profile"), the system evaluates the email based on the rules of both the currently-assigned profile and one or more other filtering profiles (the "alternative profiles"), and records the results of each (block 130). The message can then be delivered to the user in accordance with how the currently-assigned filtering profile categorized the email (block 140). If the currently-assigned filtering profile identifies the message as spam, then the email might be quarantined or delivered to a spam folder. On the other hand, if the currently-assigned filtering profile identifies the message as not spam, then the email might be delivered to the user's inbox, forwarded to the user's handheld personal digital assistant (PDA), or handled in accordance with however the user's email account is configured.

Once delivered, the user might perform one or more actions on the email (block 150). Typical actions include replying to or forwarding the message, deleting the message, or moving the message to a folder. Actions might also include identifying an email as either spam or not spam by labeling the message through a button or link.

According to one embodiment, a mechanism is provided for tracking the user's actions on the email. The actions tracked by the mechanism are referred to as "tracked actions." If the action performed by the user is not a tracked action (block 160, path 162), then no feedback will be supplied to the anti-spam system for that particular action of the user. If the action is a tracked action (block 160, path 161), then feedback detailing the action is delivered to the anti-spam system (block 170).

The feedback detailing the tracked actions can be received at an event aggregator and used to update a performance score for each of the filtering profiles (block 180). According to one embodiment, the performance scores indicate how consistent the filtering determinations of each filter are with a user's behavior. The performance score can be determined by using the feedback to identify both false positives (i.e. identifying non-spam as spam) and misses (i.e. not identifying spam as spam). Examples of user actions that might indicate a false positives include reading, replying to, forwarding, saving, moving, or flagging emails that are categorized as spam. Examples of feedback used to identify misses might include deleting a message without reading the message's body or reporting the message as spam. Additionally, an aspect of the present invention includes a mechanism such as a button or link on a user interface that allows a user to affirmatively identify an email as either spam or not spam.

In determining the performance scores of the profiles, different actions by a user might be weighted differently than other actions. For example, a user clicking a not-spam button to identify a false positive is an unambiguous indication of a false positive. In contrast, a user saving or forwarding a message delivered to the user's spam folder might create an inference of a false positive, but it is not as unambiguous as having a user affirmatively identify a false positive. Accordingly, when determining a performance score for a particular filtering profile, the two types of actions might be weighted differently, with affirmative identifications being weighted more heavily than actions that only create an inference. Feedback detailing a user's actions might also be weighted according to other criteria. For example, based on a timestamp of when the feedback was collected, newer feedback might be weighted more heavily than older feedback. In addition, feedback obtained more than a certain amount of time ago might be considered expired and no longer included when determining a filtering profile's performance score.

Once the performance score for each profile has been updated, the anti-spam system can compare the performance scores of the alternative profiles to the performance score of the currently-assigned profile to determine if one of the alternative profiles is categorizing the user's incoming emails in a way that is more consistent with the user's tracked behavior (block 190). If the currently-assigned profile is categorizing emails better than the alternative profiles (block 190, path 192), then the user might not have a different filtering profile assigned, but if an alternative profile is more accurately categorizing the incoming emails (block 190, path 191), then the user can be reassigned to one of the alternative filtering profiles (block 195).

The determination of which filter is more accurately categorizing incoming emails can be determined by comparing the performance scores of the different profiles, and assigning the user to the profile with the best performance score. In order to limit the frequency with which a user changes profiles, the system might be configured to only move the user to a different profile if the performance score of the different profile is better than the performance score of the currently-assigned profile by a specified amount, such as a fixed value or a percentage difference. The system might also be configured to prevent a user from being reassigned to a different profile if the user has been assigned to the current profile for less than a certain amount of time, or if the user has a high hop count, meaning the user has been frequently changing profiles. Other limitations on how or when a user changes profiles might be based on other parameters that are implemented dependent on design preferences.

The method described in relation to FIG. 1 is meant to be for purposes of example only, and not to be limiting. Many variations within the spirit of the present invention will be readily apparent to those skilled in the art. For example, some portions of the method may be performed in either real-time or performed periodically depending on design preferences.

System Overview

Figure 2:
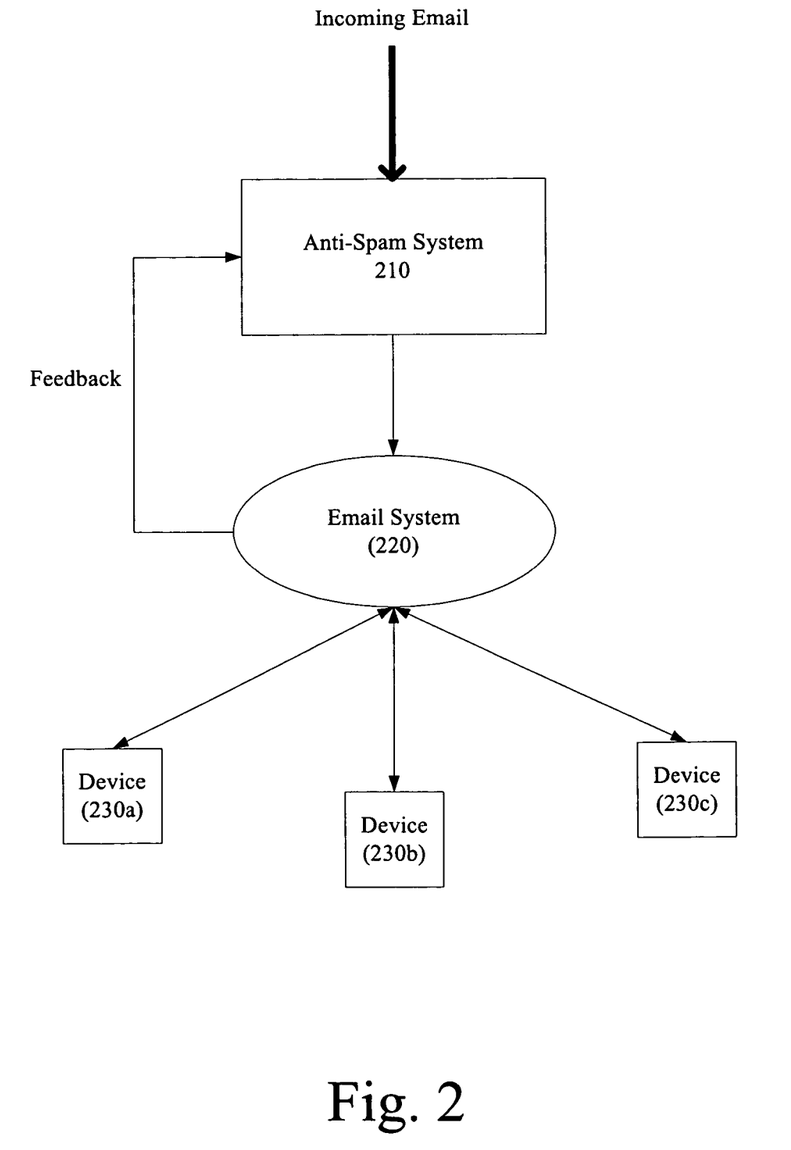
FIG. 2 shows a block diagram of an anti-spam system that embodies aspects of the present invention.

FIG. 2 illustrates an anti-spam system 210 configured according to an embodiment of the invention. Anti-spam system 210 receives incoming emails from a remote email server and applies the different filtering profiles to each incoming email. Each email is then delivered to the user's email account 220 in accordance with the determination of the currently-assigned profile of the user to whom the email is directed. The email might be delivered to a user's inbox, spam folder, or remotely quarantined depending on the determination of user's currently-assigned profile (even though other profiles may have determined that the email should be handled in other ways). A user can then access an email account through various email interface devices 230*a-c*. Examples of email interface devices 230*a-c* include internet-based webmail applications such as Yahoo Mail®, mail clients such as Outlook® and Thunderbird®, or wireless devices such as PDAs and mobile phones.

The user's actions via the email interface devices 230*a-c* can be tracked and sent back to the mail system 220 as feedback. The mail system 220 can then send the feedback to the anti-spam system 210 which can process the feedback to determine if the user should be assigned to a different filtering profile. The feedback can be sent either serially or in batch depending on design preferences.

The users' actions can be monitored in a multitude of different ways, depending on the type of email interface device 230*a-c* being used. For example, if a user accesses the email system 220 via a webmail application, then the action monitoring mechanism can be hosted and customized on the server hosting the webmail application. If the user is using a mail client such as OUTLOOK®, then the users' actions might be monitored by a plug-in or a customized feature that supports tracking of user actions. The monitoring of user actions can also be implemented on the IMAP server by tracking the IMAP commands a user mail client requests or by monitoring logs of outgoing emails. User actions can also be tracked by having the anti-spam system embed a header in incoming emails that records actions performed on that email. The header might contain information such as a unique ID, and when the user performs an action on the email, the unique ID and info about the action might be sent back to the email system. The email system can then use the received ID to find the previously determined ways that each filtering profile would have handled that email and update the performance scores for each filtering profile.

Figure 3:
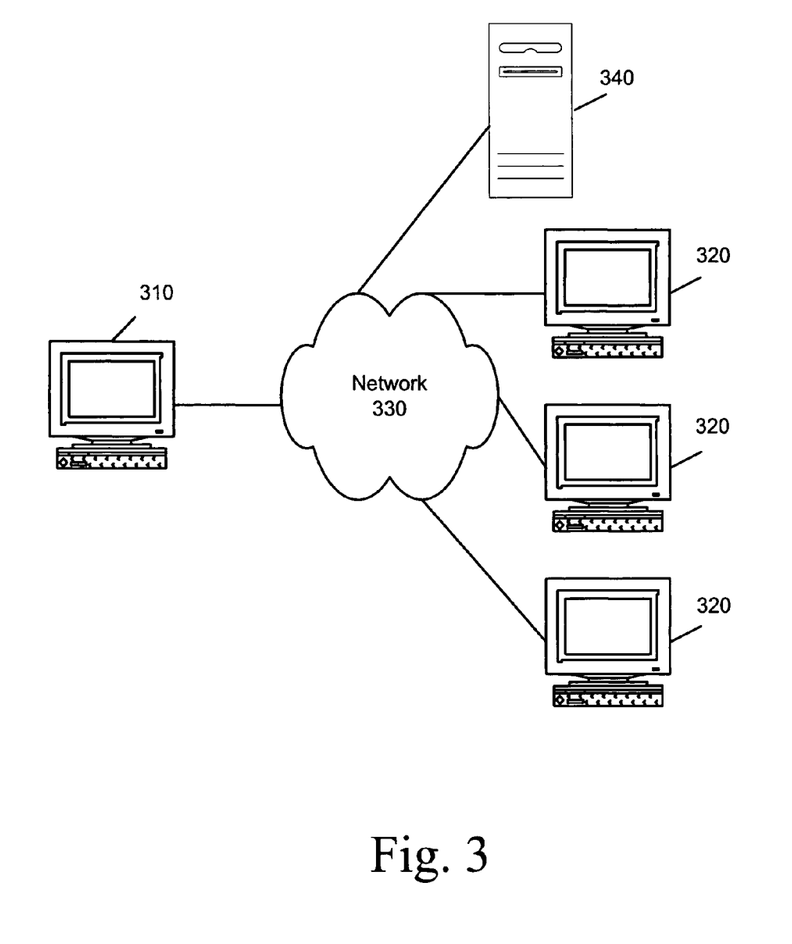
FIG. 3 shows a block diagram of a network architecture that could be used to implement an anti-spam system embodying aspects of the present invention.

FIG. 3 illustrates the components of a possible network architecture for implementing an anti-spam system embodying aspects of the present invention. The system 300 includes one or more master terminals 310, one or more user terminals 320, and one or more servers 340 connected through a network 330. One or more of the terminals 310, 320 may be personal computers, computer workstations, PDAs, or any other type of microprocessor-based device. The network 330 may be a local area network (LAN), wide area network (WAN), remote access network, an intranet, or the Internet, for example. Network links for the network 330 may include telephone lines, DSL, cable networks, T1 or T3 lines, wireless network connections, or any other arrangement that implements the transmission and reception of network signals. However, while FIG. 3 shows the terminals 310, 320 and servers 340 connected through a network 330, the terminals 310, 320 and servers 340 may alternatively be connected through other means, including directly hardwired or wirelessly connected. In addition, the terminals 310, 320 and servers 340 may be connected to other network devices not shown, such as wired or wireless routers.

It will be readily apparent to one skilled in the art that the components described in reference to FIG. 2 might be contained on one terminal 310, 320 or server 340, or distributed over multiple terminals 310, 320 and servers 340 spread out across the system. For example, the anti-spam system might be contained on a server 340 and the email interface device might be a user terminal 320 running a mail client. Alternatively, the anti-spam system might be located on the email interface device or distributed over both the server and the email interface device.

Figure 4:
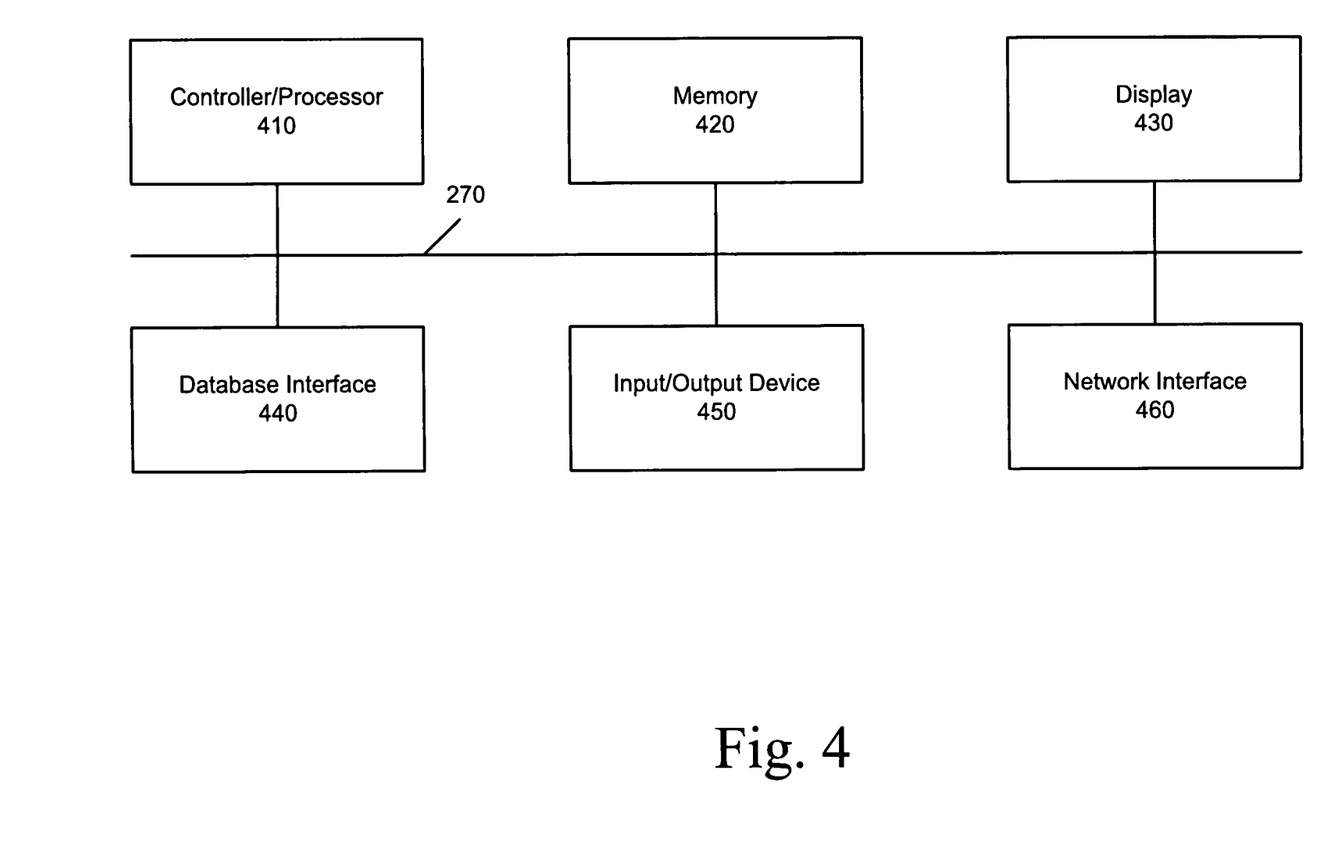
FIG. 4 shows a block diagram of a user terminal that could be used to implement an anti-spam system embodying aspects of the present invention.

FIG. 4 illustrates a possible configuration of a master terminal 310 (the user terminal 320 and server 340 may also have similar configurations). The master terminal 410 may include a controller/processor 410, memory 420, display 430, database interface 440, input/output device interface 450, and network interface 460, connected through bus 470.

The controller/processor 410 may be any programmed processor known to one of skill in the art. However, the anti-spam application might also be implemented on a general-purpose or a special purpose computer, a programmed microprocessor or microcontroller, peripheral integrated circuit elements, an application-specific integrated circuit (ASIC) or other integrated circuits, hardware/electronic logic circuits, such as a discrete element circuit, a programmable logic device, such as a PLD, PLA, FPGA, or PAL, or the like. In general, any device or devices capable of implementing the decision support method as described herein can be used to implement the decision support system functions of this invention.

The Input/Output interface 450 may be connected to one or more input devices that may include a keyboard, mouse, pen-operated touch screen or monitor, voice-recognition device, or any other device that accepts input. The Input/Output interface 450 may also be connected to one or more output devices, such as a monitor, printer, disk drive, speakers, or any other device provided to output data.

The memory 420 may include volatile and nonvolatile computer-readable data storage mediums, including one or more electrical, magnetic or optical memories such as a RAM, cache, hard drive, CD-ROM drive, tape drive or removable storage disk.

The network interface 460 may be connected to a communication device, modem, network interface card, or any other device capable of transmitting and receiving signals over a network 330. The components of the terminals 310, 320 may be connected via an electrical bus 370, for example, or linked wirelessly.

Client software and databases may be accessed by the controller/processor 410 from memory 420 or through the database interface 440, and may include, for example, an email interface application or an anti-spam application, or any other components that embody the decision support functionality of the present invention. The terminals 310, 320 and servers 340 may implement any operating system. Client and server software may be written in any programming language.

Defining the Plurality of Profiles

A system administrator can define a set of filtering profiles where each filtering profile within the set has its own unique combination of categorical and aggregating rules as well its own unique application of the rules. For example, a system administrator overseeing a corporate email system might define filtering profiles for marketing, engineering, and sales. The engineering profile might have a set of aggregating rules that identify the presence of words and phrases such as "great deal," "discount," "bargain," and so on as indicating a likelihood that the message is an unsolicited offer to sell something, and is therefore spam. For someone in sales or marketing, however, those words and phrases might be commonly used in the ordinary course of their business, meaning such a rule could lead to a large number of false positives. Therefore, the rule might only be included in the engineering filtering profile and not the marketing or sales filtering profiles.

An anti-spam system embodying aspects of the present invention might also be implemented into a publicly available email system such as YAHOO!® MAIL. In such a system, a set of filtering profiles might be defined in much the same way as in a corporate email system, only instead of having filtering profiles based on departments or job descriptions, the filtering profiles might be based on whether a user is a an international user or a domestic user, a personal user or a business user, or any other such categorization of the user. Although for purposes of explaining aspects of the present invention it is convenient to associate a particular filtering profile with a certain characteristic of a user, it is worth noting that the present invention in no way needs or requires such an association.

Each filtering profile might simultaneously apply categorical rules and aggregating rules. A set of aggregating rules determine a score when applied to an incoming email, and based on that score, the incoming email is categorized as either spam or not spam. An example of an aggregating rule is a rule that detect certain words in the body or subject of an email and assigns points based on how many times a certain type of word is present. The point value for each word might be weighted differently depending on design preferences. For example, in a particular profile, words indicating sexual content might be worth more points than words indicating an unsolicited commercial offer, or words appearing in the subject line might worth more points than words in the body of the email. The points can be cumulated to determine the email's score.

A categorical rule can be thought of as a rule that singlehandedly determines whether an email is classified as spam or non-spam. For example, a categorical rule might include maintaining lists of approved and blacklisted IP addresses and domain names, and designating incoming email as either spam or not-spam depending on which list its domain name or IP address appears. If a categorical rule deems an email to be either spam or not spam, then that categorization of the email can either supersede a determination based on the aggregating rules or can be used in conjunction with the score of the aggregating rules to determine how to categorize the email. Categorical rules can also be based on machine learning or be statistical based, in which case the categorical rules will change depending on the different data sets provided by the users of the different filtering profiles.

It will be readily apparent to one of skill in the art that the types of rules and ways in which to apply them are virtually infinite.

Performance of a Profile

Another aspect of the present invention includes maintaining a performance index for each filtering profile. The performance index can be used to evaluate the overall performance of a filter as it relates to all users, and not just the performance of a filter as it relates to a specific user. The performance index can be determined by monitoring internal usage statistics and by collecting data through the feedback supplied by a plurality of users or all users. Examples of statistics and data used to determine the performance index include catch rate, miss rate, false positive rate, user retention rate, user retention time, number of hop-ins (i.e. number of users joining the filtering profile), number of hop-outs (i.e. users leaving the filtering profile), or any other applicable criteria that might be useful in determining the overall performance of a filtering profile. The different data can be weighted differently based on configuration preferences. For example, a system administrator might deem the false-positive rate to be the most important criteria in judging the performance, and therefore weight that factor more than others.

Figure 5:
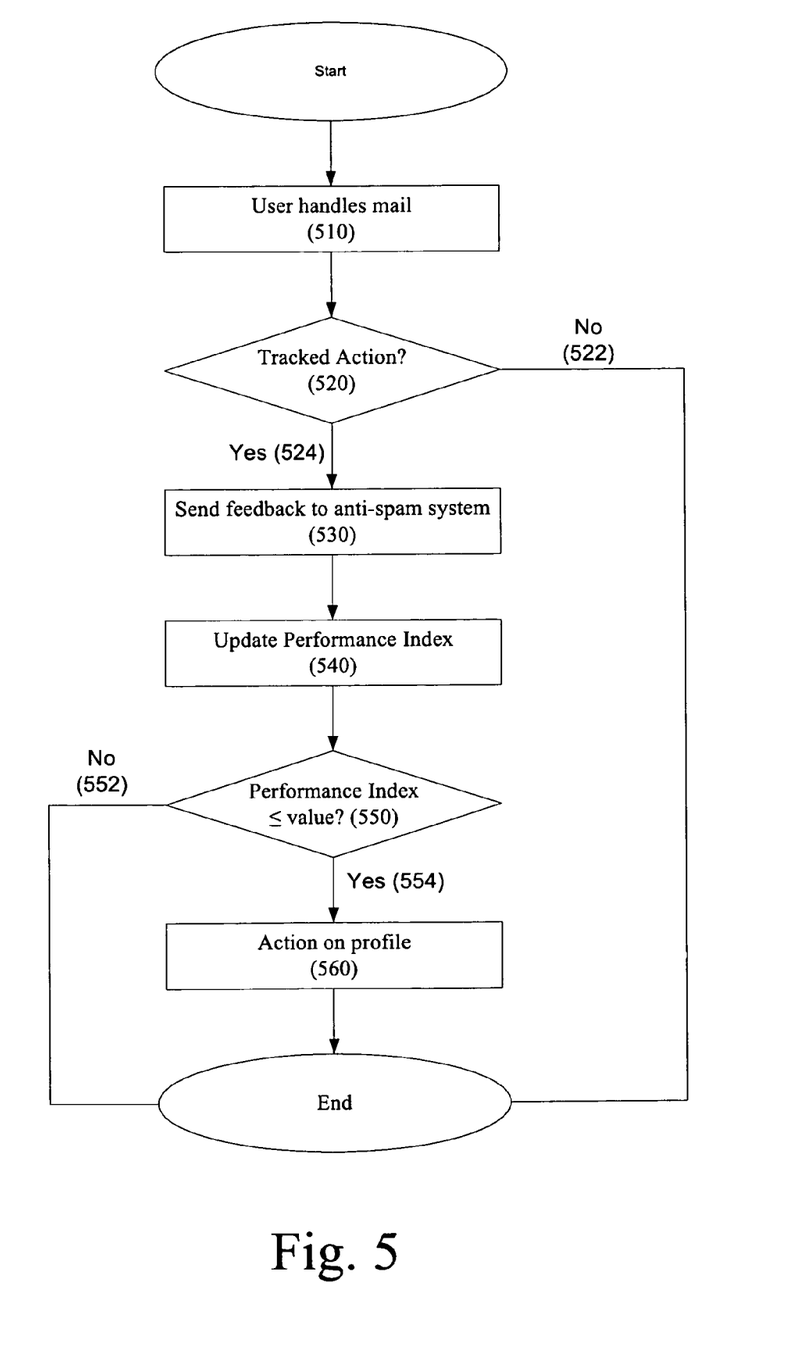
FIG. 5 shows a flow chart illustrating a method of monitoring a performance index for a filtering profile.

FIG. 5 shows an example of a method for tracking the overall performance of a filtering profile. The method includes a user handling an email that has been filtered by the anti-spam system (block 510). If the user's action is not a tracked action (block 520, path 522), then the method ends. If the user's action is a tracked action (block 520, path 524), then the feedback detailing the tracked action can be sent to the anti-spam system (block 530). Based of the feedback, the performance index for one or more of the filtering profiles can be updated (block 540). The performance indexes might also be updated based on users hopping in and out of the different filtering profiles. If the performance index of a filtering profile is above a threshold value (block 550, path 552), then no action need be taken on the filtering profile. If the performance index of a filtering profile goes below a threshold value (block 550, path 554), then a remedial action might be taken on the filtering profile (block 560). An example of a remedial action is sending an alert message to a system administrator informing the system administrator of the filtering profile's performance index, or automatically freezing the filtering profile (i.e. not allowing users to be assigned to be assigned to the profile).

In a separate embodiment, the system contains multiple performance indexes for each filtering profile. For example, the system might have a false-positive-rate performance index that tracks the frequency of false positives and a user-retention-rate performance index that tracks user retention rates. If either performance index falls below a threshold value, then the system might perform a remedial action depending on the performance index.

Extensions and Alternatives

In this description certain process steps are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method of detecting spam in incoming emails, the method comprising:

defining a plurality of filtering profiles for application to incoming email messages, wherein each filtering profile in the plurality of filtering profiles is configured to filter the incoming email messages according to a different set of filtering rules;

assigning a first filtering profile from the plurality of filtering profiles to a user;

applying rules of the set of filtering rules of the first filtering profile to the incoming email messages;

delivering the incoming email messages to the user based on the application of the rules;

tracking actions performed by the user on two or more of the incoming email messages;

using the tracked actions to determine a first performance score;

wherein the first performance score indicates how accurately the first filtering profile is filtering incoming email messages of the user;

wherein tracking the actions performed by the user on the two or more of the incoming email messages includes at least tracking a first set of actions of a first type performed by the user on one or more of the incoming email messages, and tracking a second set of actions of a second type performed by the user on one or more other of the incoming email messages;

wherein the first type is different than the second type;

wherein both the first set of actions and the second set of actions include only actions that indicate that the first filtering profile incorrectly filtered email messages that should not have been filtered;

in response to determining that the user performed an action that belongs to the first set of actions and that indicates that the first filtering profile incorrectly filtered an email message that should not have been filtered, affecting the first performance score by a first amount;

in response to determining that the user performed an action that belongs to the second set of actions and that indicates that the first filtering profile incorrectly filtered an email message that should not have been filtered, affecting the first performance score by a second amount;

wherein the first amount is different than the second amount;

assigning a second filtering profile from the plurality of filtering profiles to the user based at least in part on the first performance score as affected by at least one of the first amount or the second amount;

wherein the method is performed by one or more computing devices.

2. The method of claim 1, further comprising:

tracking actions performed by the user on the two or more of the incoming email messages to determine performance scores for all filtering profiles in the plurality of filtering profiles; and wherein the second filtering profile has the best performance score of the plurality of filtering profiles;

wherein the step of assigning is based at least in part on a comparison of the first performance score to a second performance score that indicates how accurately the second filtering profile would have filtered the incoming email messages.

3. The method of claim 1, wherein the filtering rules include aggregating rules and categorical rules, and wherein the tracking actions is performed by a plug-in installed on an email client.

4. The method of claim 1, wherein the tracking actions is performed at least in part by embedding a header in a particular email message, wherein the header of the particular email message contains a unique identifier, and wherein the unique identifier is received with information about a particular action performed by the user on the particular email message.

5. The method of claim 1, further comprising:

maintaining a first performance index concurrently with the first performance score, wherein the first performance index applies to only the first filtering profile and indicates how accurately the first filtering profile is filtering incoming email messages of a set of users that includes the user and one or more additional users; and in response to the first performance index being less than a particular index value, performing a remedial action that is different than assigning the second filtering profile from the plurality of filtering profiles to the user.

6. The method of claim 5, wherein the remedial action is sending a notification to a system administrator.

7. The method of claim 5, wherein the first performance index is determined based on one or more of: a user retention rate of the first filtering profile, a number of users joining the first filtering profile, or a number of users leaving the first filtering profile.

8. A non-transitory computer-readable storage medium storing one or more sequences of instructions, wherein execution of the one or more sequences of instructions by one or more processors causes the one or more processors to perform the steps of:

defining a plurality of filtering profiles for application to incoming email messages, wherein each filtering profile in the plurality of filtering profiles is configured to filter the incoming email messages according to a different set of filtering rules;

assigning a first filtering profile from the plurality of filtering profiles to a user;

applying rules of the set of filtering rules of the first filtering profile to the incoming email messages;

delivering the incoming email messages based on the application of the rules;

tracking actions performed by the user on two or more of the incoming email messages;

using the tracked actions to determine a first performance score, the first performance score;

wherein the first performance score indicates how accurately the first filtering profile is filtering incoming email messages of the user;

wherein tracking the actions performed by the user on the two or more of the incoming email messages includes at least tracking a first set of actions of a first type performed by the user on one or more of the incoming email messages, and tracking a second set of actions of a second type performed by the user on one or more other of the incoming email messages, wherein the first type is different than the second type;

wherein both the first set of actions and the second set of actions include only actions that indicate that the first filtering profile incorrectly filtered email messages that should not have been filtered;

in response to determining that the user performed an action that belongs to the first set of actions and that indicates that the first filtering profile incorrectly filtered an email message that should not have been filtered, affecting the first performance score by a first amount;

in response to determining that the user performed an action that belongs to the second set of actions and that indicates that the first filtering profile incorrectly filtered an email message that should not have been filtered, affecting the first performance score by a second amount;

wherein the first amount is different than the second amount;

assigning a second filtering profile from the plurality of filtering profiles to the user based at least in part on the first performance score as affected by at least one of the first amount or the second amount.

9. The non-transitory computer-readable storage medium of claim 8 storing additional instructions, wherein execution of the additional instructions by the one or more processors causes the processors to perform the additional steps of:

tracking actions performed by the user on the two or more of the incoming email messages to determine performance scores for all filtering profiles in the plurality of filtering profiles; and wherein the second filtering profile has a better performance score than other filtering profiles;

wherein the step of assigning is based at least in part on a comparison of the first performance score to a second performance score that indicates how accurately the second filtering profile would have filtered the incoming mail messages.

10. The non-transitory computer-readable storage medium of claim 8, wherein the filtering rules include aggregating rules and categorical rules, and wherein the tracking actions is performed by a plug-in installed on an email client.

11. The non-transitory computer-readable storage medium of claim 8, wherein the tracking actions is performed at least in part by embedding a header in a particular email message, wherein the header of the particular email message contains a unique identifier, and wherein the unique identifier is received with information about a particular action performed by the user on the particular email message.

12. The non-transitory computer-readable storage medium of claim 8 storing additional instructions, wherein execution of the additional instructions by the one or more processors causes the processors to perform the additional steps of:

maintaining a first performance index concurrently with the first performance score, wherein the first performance index applies to only the first filtering profile and indicates how accurately the first filtering profile is filtering incoming email messages of a set of users that includes the user and one or more additional users; and in response to the first performance index being less than a particular index value, performing a remedial action that is different than assigning the second filtering profile from the plurality of filtering profiles to the user.

13. The non-transitory computer-readable storage medium of claim 12, wherein the remedial action is sending a notification to a system administrator.

14. The non-transitory computer-readable storage medium of claim 12, wherein the first performance index is determined based on one or more of: a user retention rate of the first filtering profile, a number of users joining the first filtering profile, or a number of users leaving the first filtering profile.

15. A method of tracking a performance of a filtering profile using a filtering system, the method comprising:

defining a first filtering profile to be applied to incoming email messages of a user, wherein the first filtering profile filters the incoming email messages of the user according to a set of filtering rules;

based at least in part on actions performed on the incoming email messages of the user, determining how accurately the first filtering profile is filtering the incoming email messages of only the user;

based at least in part on actions performed on incoming email messages of a set of users that includes the user and one or more additional users, determining how accurately the first filtering profile is filtering the incoming email messages of the set of users;

maintaining, by the filtering system, both: (a) a first performance score that applies to only the first filtering profile and indicates how accurately the first filtering profile is filtering the incoming email messages of only the user, and (b) a first performance index that applies to only the first filtering profile and indicates how accurately the first filtering profile is filtering the incoming email messages of the set of users;

comparing the first performance score to a particular score value;

the filtering system performing a first type of action on the first filtering profile in response to the first performance score being less than the particular score value; and comparing the first performance index to a particular index value;

the filtering system performing a second type of action on the first filtering profile in response to the first performance index being less than the particular index value;

wherein the first type of action is different than the second type of action;

wherein the method is performed by one or more computing devices.

16. The method of claim 15, wherein the first type of action is assigning a different filtering profile to the user, and the second type of action is sending a notification to a system administrator.

17. The method of claim 15, wherein maintaining the first performance index includes recording a number of users who have been added to the first filtering profile.

18. The method of claim 15, wherein maintaining the first performance index includes recording a number of users who have been removed from the first filtering profile.

19. The method of claim 15, wherein maintaining the first performance index includes determining a user retention rate for the first filtering profile.

20. The method of claim 1, wherein the first filtering profile filters the two or more of the incoming email messages as spam, wherein the first set of actions consists of actions performed by the user to affirmatively identify the one or more of the incoming email messages as not spam, and wherein the second set of actions consists of actions performed by the user that infer that the one or more other of the incoming email messages are not spam.

21. The method of claim 1, wherein the first set of actions consists of actions that occurred more recently than actions in the second set of actions.

22. The method of claim 5, wherein the second type of action comprises freezing the first filtering profile such that users can no longer be assigned to the first filtering profile.

23. The non-transitory computer-readable storage medium of claim 8, wherein the first filtering profile filters the two or more of the incoming email messages as spam, wherein the first set of actions consists of actions performed by the user to affirmatively identify the one or more of the incoming email messages as not spam, and wherein the second set of actions consists of actions performed by the user that infer that the one or more other of the incoming email messages are not spam.

24. The non-transitory computer-readable storage medium of claim 8, wherein the first set of actions consists of actions that occurred more recently than actions in the second set of actions.

25. One or more non-transitory computer-readable media storing instructions for tracking a performance of a filtering profile using a filtering system, wherein the instructions, when executed by one or more processors, cause:

defining a first filtering profile to be applied to incoming email messages of a user, wherein the first filtering profile filters the incoming email messages of the user according to a set of filtering rules;

based at least in part on actions performed on the incoming email messages of the user, determining how accurately the first filtering profile is filtering the incoming email messages of only the user;

based at least in part on actions performed on incoming email messages of a set of users that includes the user and one or more additional users, determining how accurately the first filtering profile is filtering the incoming email messages of the set of users;

maintaining, by the filtering system, both: (a) a first performance score that applies to only the first filtering profile and indicates how accurately the first filtering profile is filtering the incoming email messages of only the user, and (b) a first performance index that applies to only the first filtering profile and indicates how accurately the first filtering profile is filtering the incoming email messages of the set of users;

comparing the first performance score to a particular score value;

performing, by the filtering system, a first type of action on the first filtering profile in response to the first performance score being less than the particular score value; and comparing the first performance index to a particular index value;

performing, the filtering system, a second type of action on the first filtering profile in response to the first performance index being less than the particular index value;

wherein the first type of action is different than the second type of action;

wherein the method is performed by one or more computing devices.

26. The method of claim 15, wherein the second type of action comprises freezing the first filtering profile such that no user can be assigned to the first filtering profile.

27. The non-transitory computer-readable storage medium of claim 25, wherein the second type of action comprises freezing the first filtering profile such that no user can be assigned to the first filtering profile.

28. The one or more non-transitory computer-readable media of claim 25, wherein the first type of action is assigning a different filtering profile to the user, and the second type of action is sending a notification to a system administrator.

29. The one or more non-transitory computer-readable media of claim 25, wherein maintaining the first performance index includes recording a number of users who have been added to the first filtering profile.

30. The one or more non-transitory computer-readable media of claim 25, wherein maintaining the first performance index includes recording a number of users who have been removed from the first filtering profile.

31. The one or more non-transitory computer-readable media of claim 25, wherein maintaining the first performance index includes determining a user retention rate for the first filtering profile.

* * * * *